May 19, 1931. J. L. MORAN ET AL 1,805,633
GOGGLES
Filed May 28, 1930

JOHN L. MORAN
ALVIN J. LEE
INVENTORS

BY Herbert E. Smith

ATTORNEY

Patented May 19, 1931

1,805,633

UNITED STATES PATENT OFFICE

JOHN L. MORAN AND ALVIN J. LEE, OF SPOKANE, WASHINGTON, ASSIGNORS, BY DIRECT AND MESNE ASSIGNMENTS, OF ONE-FOURTH TO FRANCIS E. P. WILDER, OF SPOKANE, WASHINGTON, AND ONE-FOURTH TO ROBERT MALCOM, OF CHICAGO, ILLINOIS

GOGGLES

Application filed May 28, 1930. Serial No. 456,506.

Our present invention relates to improvements in goggles which, while adapted for various uses, are especially designed for use by mechanics, machinists, and others, while at work with welding torches, abrading wheels, &c., to protect the eyes, and eye-glasses or spectacles when the latter instruments are worn by the workman.

As is well known, the magnifying lenses of the eye-glasses or spectacles are very expensive as compared with the plane glass lenses generally used in the goggles employed by the above noted artisans and in the goggles employed in the present invention. Thus, by the use of the goggles of our invention, the spectacle lenses are protected from flying particles (as from an abrading wheel) and the injury, if any, falls upon the comparatively cheap goggle-lenses, and these latter may with facility and without excessive cost be replaced.

Our invention therefore is designed not only to protect the eyes of the wearer of the goggles, but also to protect the spectacles habitually worn by the workman, and to this end the invention consists in certain novel combinations and arrangements of parts whereby the goggles may be worn with comfort, and whereby the goggles are equipped to perform their required functions with reliability and effectiveness.

In the accompanying drawings we have illustrated one complete example of the physical embodiment of our invention wherein the parts are combined and arranged according to the best mode we have thus far devised for the practical application of the principles of our invention.

In carrying out our invention we employ the complementary right and left eye-cups A and B, each fashioned as an integral unit from cast metal, as aluminum, or the cups may be formed from plastic material in suitable presses and then hardened for use.

Figure 4:
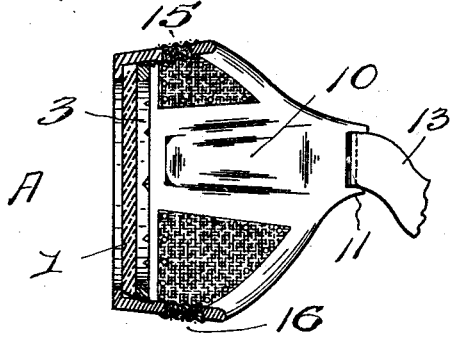
Figure 4 is a vertical sectional view of a cup at line 4—4 of Figure 1.
Figure 5:
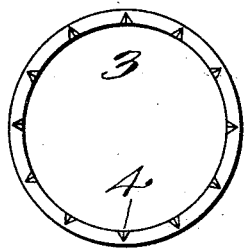
Figure 5 is a plan view of the inner, screw ring for retaining a lens within its cup.
Figure 6:
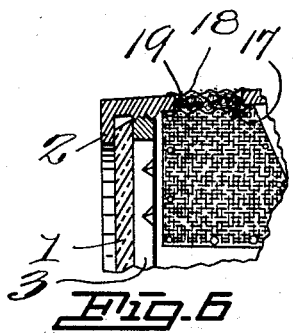
Figure 6 is an enlarged detail sectional view showing the lens-retaining ring and a portion of a ventilating screen used in the cups.
Figure 7:
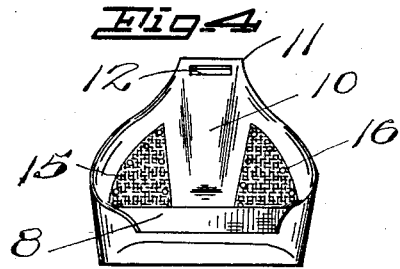
Figure 7 is a view at the inner side of one of the cups, showing the rubber guard strip.

The lens 1 in each cup is retained back of the front retaining flange 2 of the cup by means of a removable retaining ring 3, which has external screw threads engaging complementary screw threads arranged in the cup and spaced back of the front flange as shown in Figure 4. The retaining ring is provided with notches as 4 to receive the finger and thumb nails and facilitate turning of the retaining ring as it is screwed into place to clamp the lens, or for withdrawing the ring for the purpose of replacing a marred lens.

Figure 1:
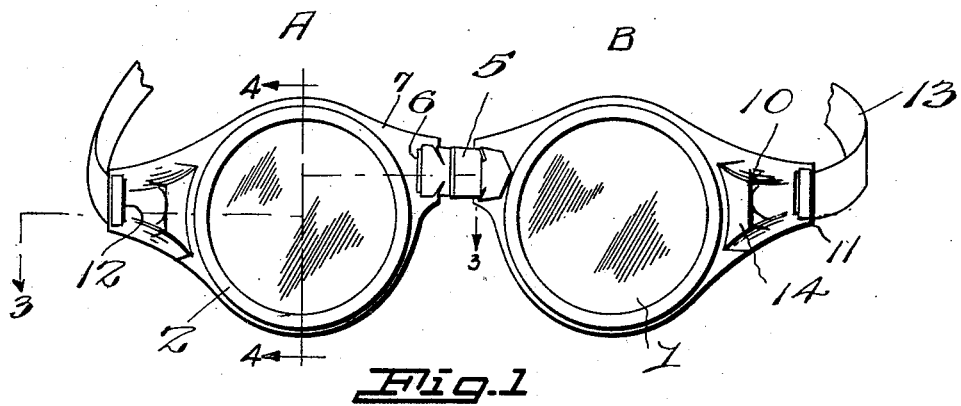
Figure 1 is a front view of a pair of goggles embodying our invention.

The two cups are joined by a flexible bridge-strap 5 that is passed through slots 6 vertically disposed in complementary flanges 7 which project from the cups and extend toward the vertical center line of the goggles, and by the use of this flexible connection the cups readily adjust themselves for use. As seen in Figure 1 these flanges are located above the horizontal axis of the goggles, and the flexible bridge strap is thus disposed directly in front of the bridge piece of the spectacles worn by the wearer of the goggles, and back of the goggles.

The width of the flanges and the corresponding, wide strap, insure a stable bridge joint between the cups of the goggles, and assist in maintaining the cups in position over the spectacle lenses in such manner as to provide for the comfort of the wearer of the spectacles and the enclosing goggles.

In order to provide a neat and effective fit between the cups of the goggles and the cheeks adjacent the nose-bridge of the goggles, we employ a flexible cushion-strip 8, preferably of sheet rubber, or other suitable material, which has its edge embedded in an arcuate groove 9 in the rear face of each cup. This elastic, flexible, cushion strip or shield may readily be compressed, or its shape otherwise changed in adapting it to its purpose of closing the inner side of the cup against ingress of particles of metal, dust &c., as for instance when the goggles are being worn by a workman at an abrading wheel.

It will be noted that the walls of the cups are cut away at their inner, adjoining edges or sides, and this rubber cushion or flexible wall insures a complete closure of any aperture that would otherwise occur at the inner side of a cup.

Figure 2:
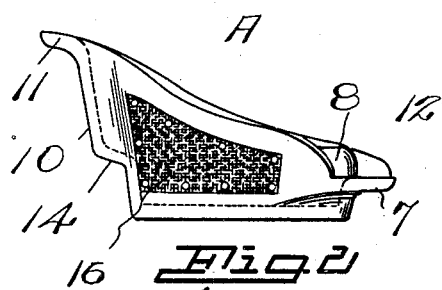
Figure 2 is an underside view of one of the eye-cups of the goggles.
Figure 3:
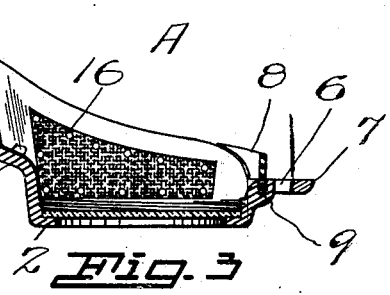
Figure 3 is a sectional view of a cup at line 3—3 of Figure 1.

At the outer sides of the respective cups, where the walls reach their maximum length, the cups are fashioned with out-set temple-housings 10. The rear edges of the cups have a curvature to conform to the facial contour surrounding the eyes, and the outer wall of each temple housing terminates at the rear in an outwardly flared flange 11 having a slot 12 for the attachment of the ends of an elastic band or strap 13 which passes around the back of the head and is fastened to retain the goggles in position. The front wall 14 of the temple housing, as shown in Figures 2 and 3, terminates the housing some distance back of the lens-retaining flange 2 of the cup. The bridge-flanges 7 of the cups are also located back of the retaining flanges 2 of the cups, and this arrangement of the temple housings and bridge flanges provides for a spaced relation of the lenses of the spectacles and the lenses of the goggles, thereby preventing frictional contact between the sets of lenses, and insuring comfort to the wearer of the goggles and spectacles.

The temple housings fit neatly over the hinge joints at the rear ends of the temples or ear-bars of the spectacles and the flanges 7 and cushion-strips 8 of the cups provide for a comfortable support of the goggles over the bridge of the spectacles.

Each cup is fashioned with a ventilating opening or aperture as 15 and 16 respectively to provide a circulation of air within the cups and thus prevent accumulation of moisture on the lenses, as well as insuring proper conditions within the cups for the eyes. The vent openings are provided with filtering screens made up of an inner mesh 17 and an outer mesh 18, with a filter 19 between the meshes. This filter material may be steel wool or other suitable material that will prevent ingress of fine particles of dust, and yet permit the required circulation of air through the vent openings for the purpose desired.

Having thus fully described our invention, what we claim as new and desire to secure by Letters Patent is:—

1. The combination in a pair of goggles with complementary cups, of integral slotted bridge-flanges on the cups and a bridge-strap, said flanges being spaced back of the lens of each cup, an integral, outset temple housing on each cup having its front wall terminating back of the lens of the cup, upper and lower vent openings in the cups, and rubber shields seated in grooves adjacent the bridge flanges forming continuations of the rear edges of the cups.

2. In goggles of the character described provided with a pair of eye-cups flexibly connected together, each eye-cup on the nose side thereof at a point above the transverse axis of the cup and rearward of the lens-seat of the cup being provided with a slotted flange disposed toward the other eye-cup; the side walls of each cup terminating adjacent to the marginal edges of said flange, the rear face of each cup being provided with a groove in alignment with the side wall; a flexible cushion strip edgewisely inserted in said groove to constitute a flexible closure for the inner side of each cup; while the outer temple side of each cup is formed with an integral out-set portion extending from a point rearward of the lens-seat to the face-engaging perimeter and terminating in a laterally disposed slotted head band attaching flange.

3. In goggles of the character described having a pair of eye-cups flexibly connected together, each eye-cup on its nose side rearward of and above the transverse axis having a laterally extending slotted flange disposed toward the other eye-cup; the side walls of each cup terminating adjacent to said flange; a strip of flexible material secured to the cup so as to constitute a closure for the side wall opening across said flange; the outer temple side of each eye-cup rearward of the lens holding end being out-set to provide a spectacle arm receiving socket disposed transversely of the side wall and terminating in an outwardly disposed slotted head band attaching flange; vent openings in the top and bottom side walls of each cup provided with spaced apart screens; and filtering material arranged between said screens.

4. In goggles of the character described having a pair of eye-cups flexibly connected together, each eye-cup in its top and bottom side walls being provided with openings; screens arranged in spaced relation across said openings and secured to the side walls; and a porous filtering medium arranged between the spaced screens throughout said openings.

In testimony whereof we affix our signatures.

JOHN L. MORAN.
ALVIN J. LEE.